US00RE34691E

United States Patent [19]

White

[11] E Patent Number: Re. 34,691

[45] Reissued Date of Patent: Aug. 9, 1994

[54] FLUID CHARGED ROADWAY BARRIER

[76] Inventor: John M. White, 9821 Fox Rest La., Vienna, Va. 22181

[21] Appl. No.: 992,920

[22] Filed: Dec. 18, 1992

Related U.S. Patent Documents

Reissue of:

[64] Patent No.: 4,978,245
Issued: Dec. 18, 1990
Appl. No.: 396,336
Filed: Aug. 21, 1989

[51] Int. Cl.[5] ..... E01F 13/00

[52] U.S. Cl. ..... 404/6; 404/10; 404/13; 116/63 P

[58] Field of Search ..... 404/6, 7, 9, 12–14; 256/64; 116/63 P, 63 R

[56] References Cited

U.S. PATENT DOCUMENTS

| | | | |
|---|---|---|---|
| 3,795,220 | 4/1972 | Hengesbach | 116/63 P |
| 3,880,406 | 4/1975 | Stehle et al. | 116/63 P X |
| 4,071,224 | 1/1978 | Gilbert | 116/63 P X |
| 4,104,980 | 6/1977 | Toomey | 116/63 P |
| 4,298,186 | 11/1981 | Glass | 404/6 X |
| 4,624,210 | 11/1986 | Glass | 116/63 P |
| 4,681,302 | 7/1987 | Thompson | 404/6 X |
| 4,852,511 | 8/1989 | Look et al. | 116/63 P |

OTHER PUBLICATIONS

"Hi-Dro Sandwich System Design Manual"; Energy Absorption Systems, Inc.; 7 pages; Copyright 1985 Energy Absorption Systems, Inc.

*Primary Examiner*—Ramon S. Britts
*Assistant Examiner*—Roger J. Schoeppel
*Attorney, Agent, or Firm*—Longacre & White

[57] ABSTRACT

The invention is directed to a light weight, fluid charged, stackable, and easily placeable traffic barrier. The barrier includes a lightweight frame, made up of a skin or other lightweight framing elements. The barrier includes an interior bladder chamber for charging with a weighting fluid.

4 Claims, 4 Drawing Sheets

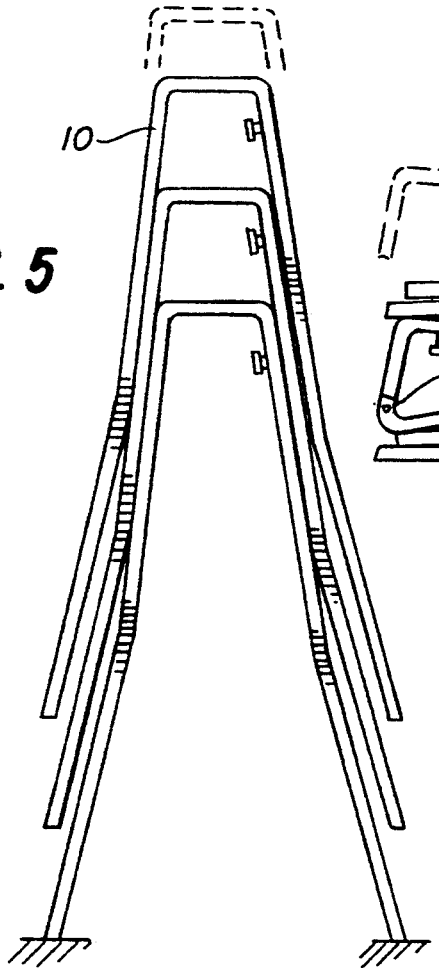
FIG. 5
FIG. 6
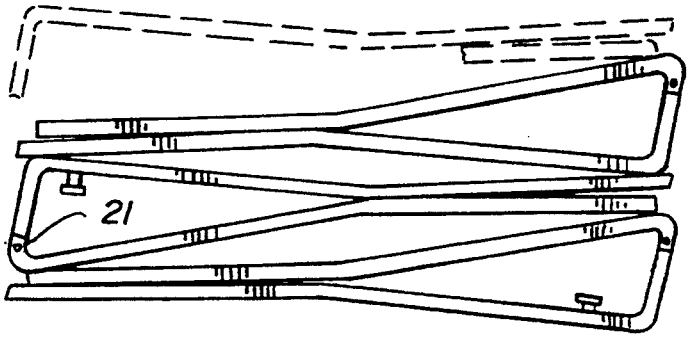
FIG. 7
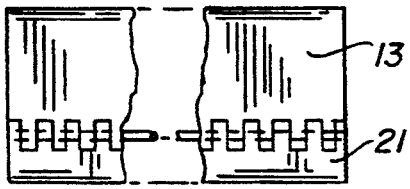
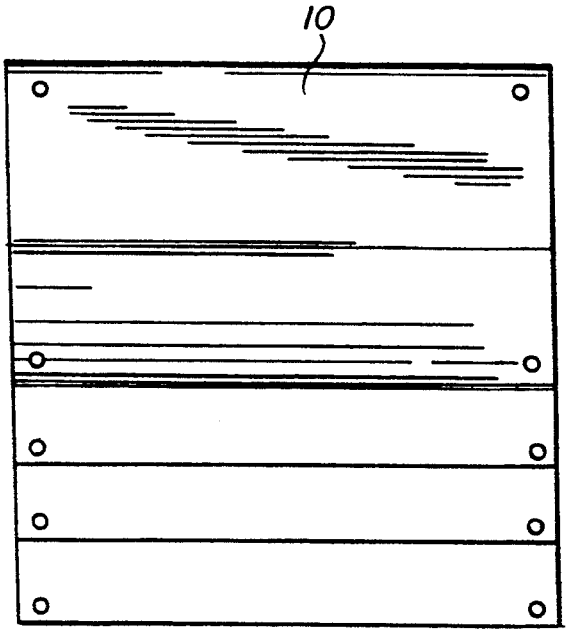
FIG. 8
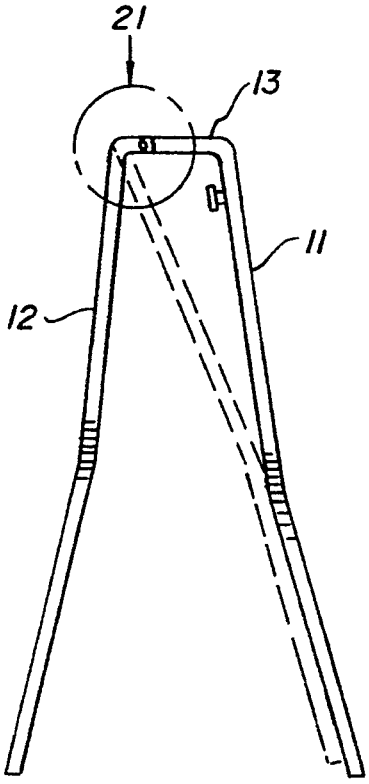
FIG. 9

FIG. 10
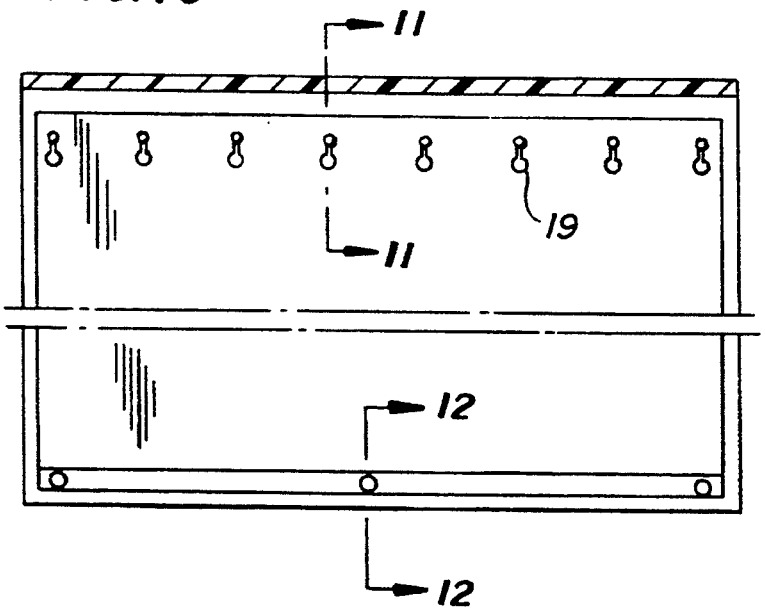
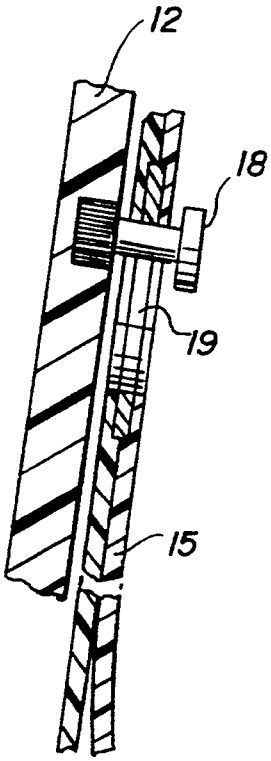
FIG. 11
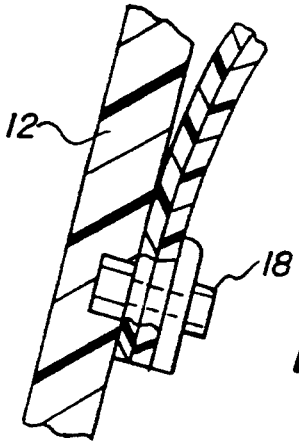
FIG. 12
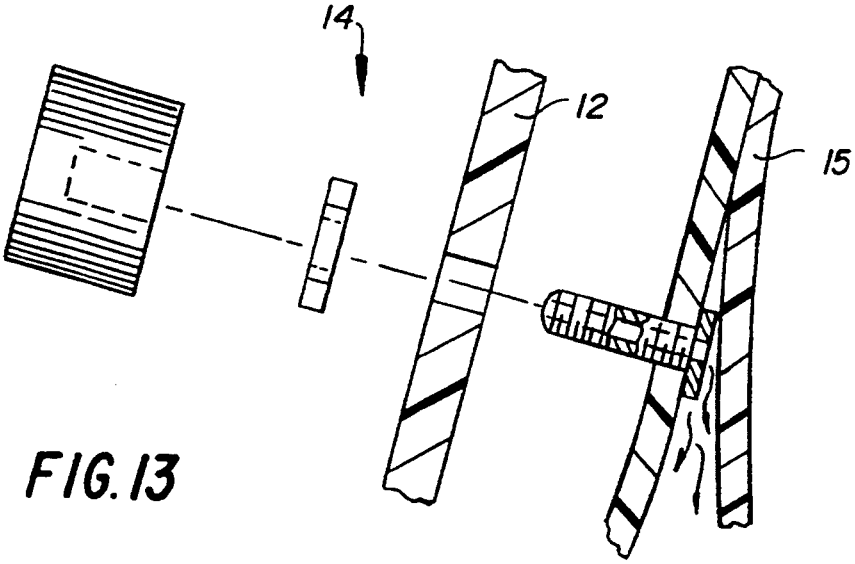
FIG. 13

FLUID CHARGED ROADWAY BARRIER

Matter enclosed in heavy brackets [ ] appears in the original patent but forms no part of this reissue specification; matter printed in italics indicates the additions made by reissue.

FIELD OF THE INVENTION

This invention relates to the field of portable roadway traffic barriers. Specifically, this invention relates to a light-weight, fluid charged, stackable, and easily placeable traffic barrier. The barrier includes a light weight frame, made up of the skin of the barrier, augmented if necessary by additional framing elements, and includes a bladder member for containing the charging fluid.

BACKGROUND OF THE INVENTION

As the infrastructure of civilized societies deteriorates, the necessity of re-building this infrastructure becomes overwhelming. An important part of this infrastructure is the roadway system which supports the transport of countless goods, services, and persons.

The maintenance of roadway systems usually require that the roadway remain in service during maintenance and repair operations. As a result, the necessity of providing traffic control systems which are both flexible and safe has become increasingly apparent.

To address the requirement of temporary and safe traffic control systems, the prior art has provided a variety of wooden, concrete, plastic, or other barriers including various reflector elements to guide traffic day and night through and around construction and maintenance zones. One of the more popular temporary barriers includes a temporary concrete barrier. This concrete barrier is termed a "Jersey" barrier and is used extensively in heavy traffic maintenance operations.

The concrete barrier has several advantages in that it is rather impervious to the elements (freeze/thaw and traffic abrasions) and the barrier is relatively immovable owing to its "mass". Hence, the use of such barriers along dangerous roadsides, i.e., wherein hazards exist only several feet from the edge of the travelled lane, has become quite popular. Further, again owing to the relative immovability of the barrier, use of the barrier where a substantial amount of combined pedestrian and vehicular traffic is expected is also quite popular.

The largest drawback to the use of these concrete barriers is the sheer mass of the barriers and the consequent difficulty in placing, removing, and transporting the barriers to the several locations where they will be used. Oftentimes, during barrier placement operations, the travelled lane adjacent the construction area where the barriers will be placed is shut down to traffic for a lengthy period. Further, the barriers require a relatively large tractor-trailer or flatbed truck to haul only small quantities at a time. Placement of the barriers requires at least a ten-ton crane including a skilled crane operator, and at least three laborers for proper positioning. Needless to say, this process is slow, labor intensive, a traffic hazard, and requires expensive equipment rental to properly accomplish.

Also, once the barriers have been placed, an errant large vehicle i.e., truck or bus, can displace one of the several barriers only slightly, and create a hazard for further light (cars and motorcycles) vehicular traffic along the barriers. Again, the necessity of a crane and trained personnel are required so as to correct the displaced barrier and reduce the hazard.

SUMMARY OF THE INVENTION

The present invention eliminates the costly drawbacks of the previously discussed concrete barriers, but nevertheless retains some of the many advantages of a "massive" barrier system. The present invention uses a lightweight stiff frame member in combination with a bladder element. This unique combination enables a light placement weight along with a "massive" in-place weight. The frame member can comprise a fiberglass or other plasticized light weight skin, either with or without additional framing augmentation, and a bladder member which can be any of a variety of expandable water impenetrable synthetic materials.

Owing to the hollow shell configuration of the barriers, they are front and rear stackable, and require only a light-duty truck for transport to and around a job site. Further, the barriers may be placed by only two unskilled laborers without the aid of a crane. Once in place, the barriers are charged with water from the job site water truck.

This simple placement procedure and relative portability would encourage the use of a "massive" barrier system in very temporary circumstances, i.e., single day jobs. Whereas, the prior art massive concrete barrier systems could not be cost or time justified for such temporary placement.

BRIEF DESCRIPTION OF THE DRAWINGS

FIG. 5 is an end view of several barriers according to the present invention in a stacked configuration.

FIG. 6 is an end view of an alternative embodiment of the present barrier invention, wherein the barrier comprises hinged elements which allow horizontal stacking.

FIG. 7 is a top view of an alternative embodiment of the present invention.

FIG. 8 an elevational view of stacked barriers according to the present invention as shown in FIG. 5.

FIG. 9 is an end view of an alternative embodiment of the barrier according to the present invention.

FIG. 10 is a cross sectional view of a barrier according to the present invention showing the attachment of the interior bladder.

FIG. 11 is a sectional view of the bladder connection according to the present invention shown along section CC of FIG. 10.

FIG. 12 is a bladder attachment detail of the barrier according to the present invention, as shown along section DD of FIG. 10.

FIG. 13 illustrates a valve configuration according to the present invention.

DETAILED DESCRIPTION OF THE PREFERRED EMBODIMENT

Figure 1:
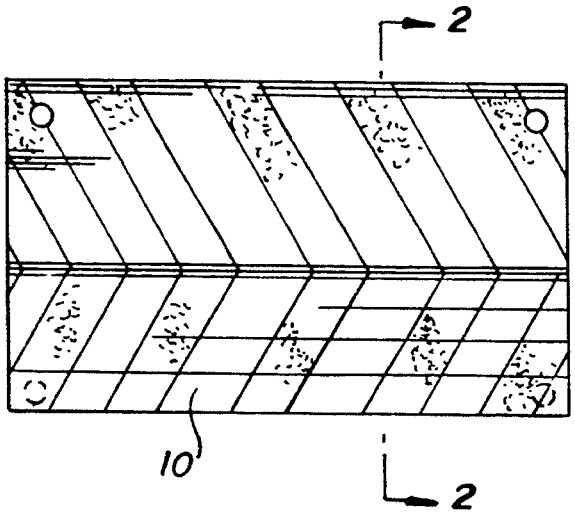
FIG. 1 is a front elevational view of an improved barrier according to the present invention.

FIG. 1 shows an elevational front-view of a traffic barrier according to the present invention. The barrier includes an outer shell portion 10. The shell includes front rear portions 11 and 12 connected by a crown portion 13 along the upper edges of the front and rear portions.

The shell 10 may comprise any light-weight sturdy sheeting material such as fiberglass, P.V.C., plywood, synthetic rubbers, etc. The shell should be sufficiently thick to withstand expected traffic abuse in a particular placement environment. That is, where the barriers are used primarily to re-direct pedestrian and light-vehicular traffic, a fiberglass shell only $\frac{3}{8}$"–3/16" thick may be required, whereas heavier vehicular traffic, i.e., automobiles, may require fiberglass upwards of $\frac{1}{4}$" thick, including additional framing augmentation.

Figure 2:
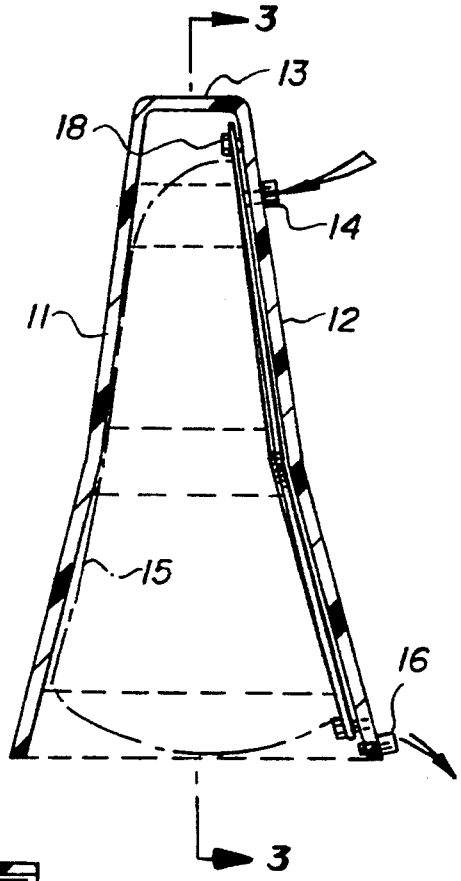
FIG. 2 is a sectional view of a barrier according to the present invention along section AA of FIG. 1.
Figure 3:
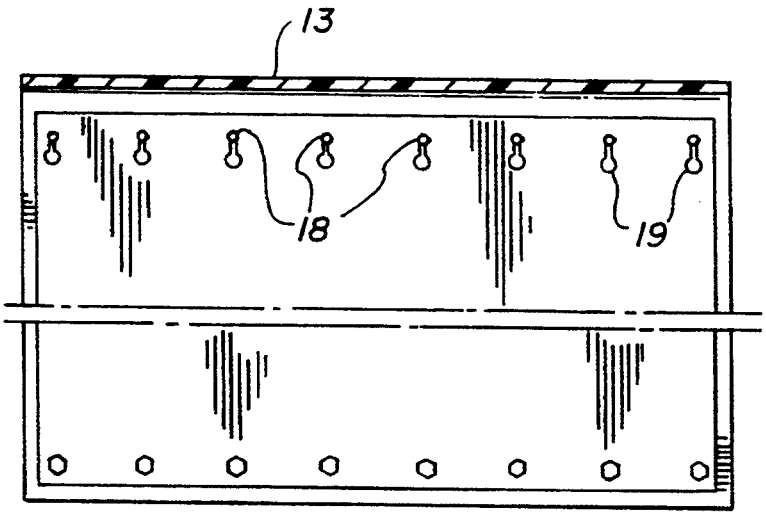
FIG. 3 is a sectional view of a barrier according to the present invention along section BB of FIG. 2.

FIG. 2 shows the barrier of FIG. 1 along section AA. The shell 10 includes front and back portions, 11 and 12 respectively, including an upper crown portion 13 connecting the forward and back portions. The back portion 11 includes a charging valve 14 preferably positioned near the crown portion 13 of the barrier. The charging valve 14 provides a passage through the shell 10 of the barrier into bladder 15. The bladder 15 is fixedly attached to either of the front or back side of the inner surface of the shell 10 of the barrier.

The bladder 15 may comprise any of a variety of expandable synthetic materials, or may comprise treated fabrics which are impenetrable to water. The side of the barrier shell 10 having the bladder attached thereto may also include a discharge valve 16. Preferably, the discharge valve 16 is included along a lower portion of the rearward portion 12 of the barrier. The discharge valve 16 provides a passageway for allowing discharge of the weighting fluid mass from the barrier according to gravity and the natural resilient contraction of the bladder 15.

Each of the charging and discharge valves 14 and 16 respectively may include tamper resistant covers which prevent unauthorized personnel from discharging the barriers at inappropriate moments. For example, the tamper resistant measures for the valves may include key shaped valve twisting portions wherein keys are provided only to authorized personnel.

Valve 14 may comprise a hollow stem with an exteriorly threaded portion. The hollow stem and threaded portion would include a flange fitting within the bladder interior chamber and extend through the bladder wall. The stem is placed through a passage in either of the forward or rearward portions of the shell. For illustration only, the shell portion shown is the rearward portion 12. The stem valve would then include a threaded retainer which would enable securement of the valve 14 to shell 10. This illustration of valve 14 is for example purposes only, and is not intended to limit the type of valve which can be used to charge bladder member 15.

Bladder 15 is affixed to the inner surface of the shell 10 by any fasteners which are secure, i.e. nut and bolt, slot and tab, cotter pin and stud, etc. FIG. 2 illustrates a bladder bolt 18 placed through a slotted eyelet 19 in the bladder and secured through an aligned passageway in the shell member 10 of the barrier.

Drawing FIGS. 10, 11, and 12 provide further detailed illustration of a suggested method of bladder attachment to the shell members of the barrier. The bladder 15 may include several slotted eyelets 19 as shown in FIG. 10. The eyelets would engage and fit onto post or bolt members 18. The post or bolt member 18 can be embedded in the shell portion of the barrier. For illustration purposes only, the rearward shell portion 12 is shown as receiving the post or bolt members 18. The upper attachment feature is shown as an eyelet so as to facilitate slipping the bladder member over the upper post or bolt members. The lower attachment of the bladder 15 to the shell 10 is accomplished by a simple bolt or post member.

Depending on the size of the barrier, additional cross-brace webbing may be required at the end and mid sections of each barrier so as to prevent the barrier, when fully charged, from expanding and fracturing the shell 10. Examples of end section bracing are shown in FIGS. 17–20. Braces 40 may be clamped or wedged on the opposite end sections of the barrier shell 10. Mid-section bracing would similarly be attached to opposing side portions of the barrier through sealed passages (not shown) in the bladder 15.

Figure 4:
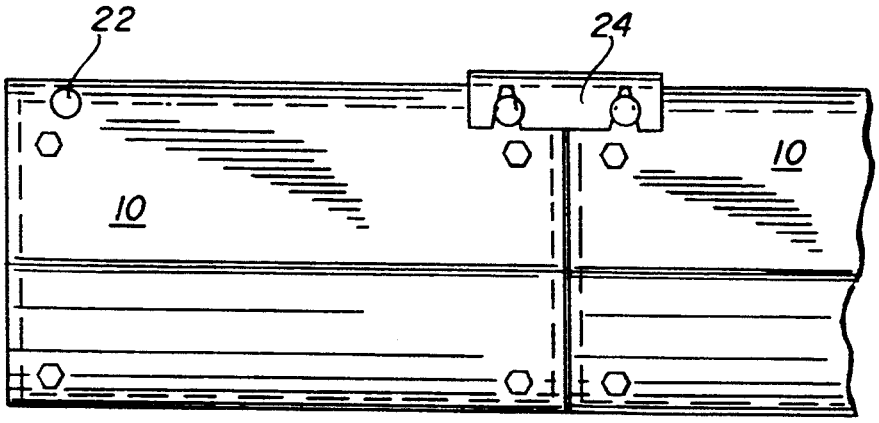
FIG. 4 an elevational view of barriers according to the present invention linked together by a locking plate.

FIG. 4 discloses a locking plate 24 attached to locking lugs 22. Locking lugs 22 are positioned along the end portions of the sidewalls of the shell 10. The locking lugs in combination with the locking plate 24 enable the barriers to be secured together in adjacent positions. In this manner, the mass of one barrier may contribute to the immobility of the mass of an adjacent barrier.

While only two locking lugs 22 are demonstrated in the drawing figures, locking lugs 22 may be used along an entire side portion of the barriers depending on the nature (pedestrian, light or heavy vehicles) of the expected traffic. Additionally, reinforcing plates, etc. may be necessary to secure the locking lugs in place. For example, light vehicular traffic may only require a single locking lug to be drilled and placed into a passageway in the shell of the traffic barrier, whereas heavy vehicular traffic may require locking lugs to be positioned on a separate plate element which is itself integrally molded into, or otherwise attached to, the shell of the traffic barrier.

Figure 14:
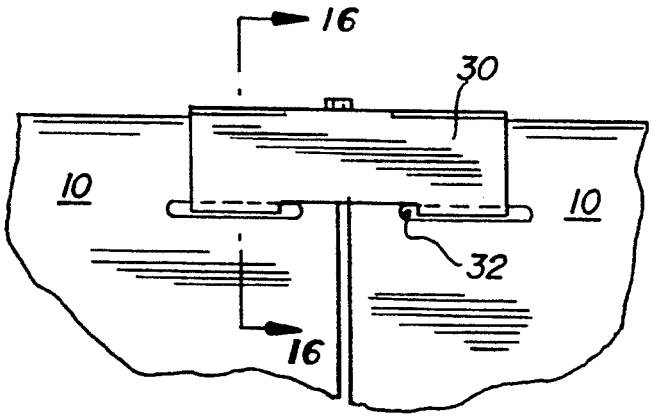
FIG. 14 discloses an alternative locking plate embodiment according to the present invention.
Figure 15:
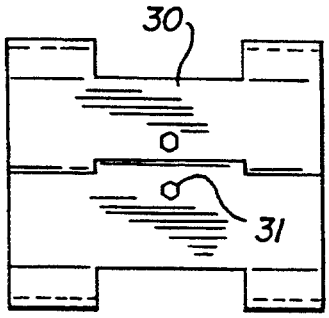
FIG. 15 discloses a top view of the alternative locking plate according to the present invention.
Figure 16:
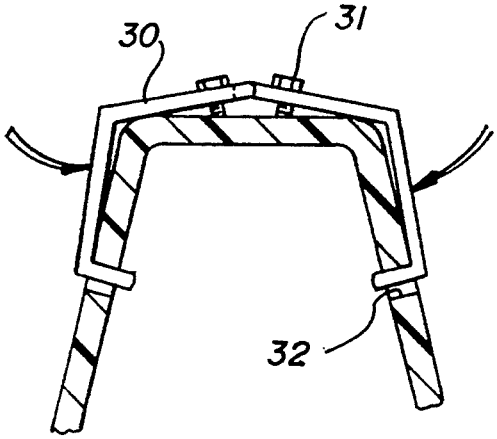
FIG. 16 shows a sectional view of a locking plate according to the present invention, along section EE of FIG. 14.
Figure 17:
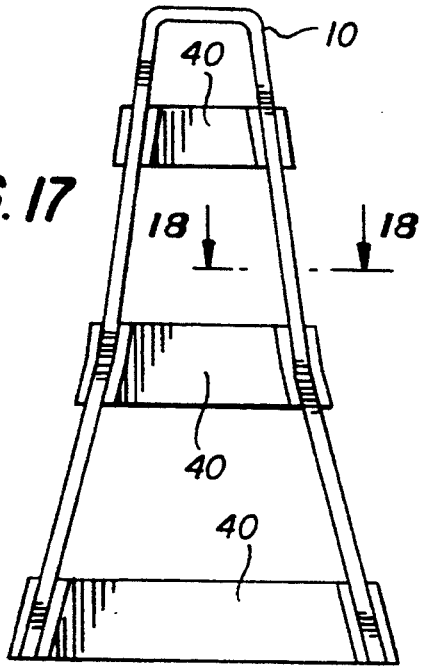
FIG. 17 shows an end view of a barrier according to the present invention including bracing members.
Figure 18:
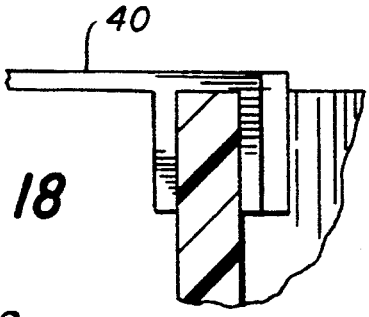
FIG. 18 shows a detail of bracing attachment according to the present, invention, as shown from section FF of FIG. 17.
Figure 19:
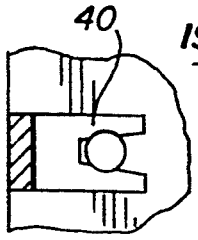
FIG. 19 shows an alternative bracing attachment according to the present invention, along section GG of FIG. 20.
Figure 20:
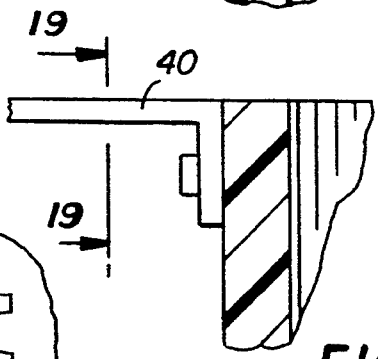
FIG. 20 shows a sectional view of a detail of bracing attachment according to present invention.

FIGS. 14, 15, and 16 illustrate an alternative locking plate 30 for positively attaching adjacent barrier shells 10. The locking place 30 comprises a pair of hinged portions which include depending flanges for insertion into slots 32. The slots 32 are included on the upper end portions of the shells 10, and allow positive attachment of the alternative locking plate 30. The locking plate 30 includes two bolt members 31 which urge the depending flange members of the locking plate assembly into the slots 32.

FIGS. 5 and 8 demonstrate the stackable nature of the traffic barrier shells when the bladder 15 has been fully discharged of fluid. Since the bladder 15 is secured to either of the shell inner surfaces, the traffic barriers may be successively stacked in a convenient manner without damage to the bladder. As such, the traffic barriers of the present invention require far less warehouse and transport space than conventional wholly containerized fluid or sand filled or solid barriers.

FIGS. 6, 7, and 9 disclose an alternative embodiment of the present invention wherein the shell member 10 includes a front portion 11 and crown portion 13 with a hinged rearward portion 12. Instead of having a fixed rearward portion, as in FIG. 2, the rear portion of the alternative barrier is replaced by a hinged frame system 12. The framing system may comprise plastic, metal, or other framing elements (either in sheet or stick, i.e. tubular, form) mounted so as to hinge along the edge portion of the crown 13. In this manner, the barrier is moderately collapsible. As in the previously disclosed embodiment, the bladder 15 is secured to either of the forward shell portion 11 or rearward hinging frame elements 12 and is provided with appropriate valving so as to charge and discharge the bladder 15.

The alternative embodiment disclosed in FIGS. 6, 7 and 9 is capable of being folded to a reduced cross sectional dimension and is stackable one on top of the next in a flat manner. In this way, reduced transport space is required, and a variety of open-bed vehicles can accommodate a large number of the barriers.

The shell 10 of the barrier may include any combination of colors, i.e., orange, yellow, pearlescent white, red, etc., suitable for providing the necessary traffic control indicators. Further, the barrier may comprise a material, i.e., plastic, wood, fiberglass, etc., necessary to meet the maintenance, availability, and initial cost requirements for a particular application.

The dimensions of the barrier are flexible to the extent that an overall pyramidal or tapering shape is retained from top to bottom. That is, the crown portion of the barrier should be of a smaller dimension than the base portion so as to retain reasonable stability characteristics when standing charged or uncharged with fluid. Specific dimensions should be derived so as to resolve a particular traffic control circumstance, i.e. pedestrian, light vehicles, etc.

For example, particularly heavy vehicular traffic may require a barrier wherein the crown portion is up to two and one half feet wide and a base portion of up to four feet wide, a height of three and one half feet, and a length of approximately nine feet. Such dimensions would yield an in-place barrier weight in the range of three tons when fully charged with water. Such a mass would approximate the relative immovability and mass of a typical concrete barrier, of smaller width dimensions, presently used in similar traffic control applications.

Where light vehicular traffic is expected, a barrier dimension of 6" at the crown and two and one half feet at the base, a height of three and one half feet, with a nine foot length would yield an in-place barrier weight of slightly over one and one half tons. Such a barrier would be useful for light traffic, as might be expected along smaller city streets and residential areas.

The advantages of the present invention are many. Firstly, the ease and reduced cost of placement as compared with a concrete barrier are readily apparent. The concrete barrier requires heavier and more expensive equipment to place and remove, and further requires skilled labor to augment the heavy equipment. The present invention, by comparison, can be placed from a light duty truck with unskilled labor, only augmented by a water truck. It should be noted, however, that the improved barrier is not suggested as a replacement for concrete barriers in all applications. Rather, the present barrier is proposed as an alternative to concrete barriers in temporary placement situations.

Also, when a barrier system is required only for a short placement time, i.e., several hours at a time, a foreman and a pick-up truck along with only one or two laborers can easily erect a safe temporary barrier system for even the small jobs around the construction site. This particular use offers tremendous safety advantages as compared to the much less protective stick or cone barriers presently used. Also, if a truck or other vehicle entrance is required along a barrier system according to the present invention, the selected barriers need only be discharged of fluid and the barrier shells relocated to temporary storage by manual labor. When the temporary entrance requirement is no longer necessary, the erection of the barriers is easily accomplished by simply replacing the barriers and recharging them with fluid.

Whereas portable concrete barriers are presently designed to meet a finite variety of dimensional standards, the present barrier could be custom designed to a wide variety of uses and tasks. The critical dimensions and construction materials of the barrier are left for a designer to determine after contemplating the nature of the expected traffic, maintenance considerations, and environmental conditions.

The barrier system according, to the present invention, is considered for year-round use, with the only requirement for cold weather use being the addition of an anti-freeze component in the available charging fluid. The barriers may also take on a semi-permanent configuration if a slurry of concrete or hardening resin is pumped into the bladder section. The custom applications of the presently disclosed barrier system are virtually limitless.

I claim:

1. A roadway barrier comprising:

[inverted U shaped] *generally rigid* shell means [having] *including* forward and rearward portions, [having inner and outer surfaces, and] *said forward and rearward portions* defining [a space between said inner surfaces] *an interior volume between said forward and rearward portions;* expandable bladder means for containing [a fluid] *fluent material*, said bladder means being secured to [an inner surface of only] *a first* one of [either of] of said forward or rearward portions, said bladder means [closely following said inner surface of said portion to which it is connected throughout the height of said inner surface] *containing fluent material substantially filling said interior volume* and [when said bladder is empty of fluid,] said bladder *means* resiliently collapsing against [said] *an* inner surface *of said first portion when said bladder means is substantially empty of fluent material*; and valve means for [enabling] *retaining,* charging and discharging of fluent material from within said bladder means, whereby when fluent material is charged into said bladder *means*, said bladder *means* expands and substantially [entirely] fills said [space] *interior volume* between said forward and rearward portions of said shell means, and when said bladder *means* is discharged, said bladder *means* resiliently collapses within said shell *means* to enable nested stacking of said shell means.

2. A roadway barrier as recited in claim 1, further comprising:

hinge means connected between said forward and rearward portions for enabling relative hinging movement between said portions.

3. A roadway barrier as recited in claim 1, further comprising:

connecting means for linking adjacently positioned barriers one to [the other] *another* whereby a row of barriers can form a contiguous grouping of barriers.

4. A roadway barrier as recited in claim 2, further comprising:

connecting means for linking adjacently positioned barriers one to [the other] *another* whereby a row of barriers can form a contiguous grouping of barriers.

* * * * *